July 22, 1958     T. J. ALLEN     2,844,420

INSERT BEARING STRUCTURE AND SHIM THEREFOR

Filed April 19, 1946

Inventor
THOMAS J. ALLEN
By William B. Hall
Attorney

United States Patent Office 2,844,420
Patented July 22, 1958

2,844,420

INSERT BEARING STRUCTURE AND SHIM THEREFOR

Thomas J. Allen, Los Angeles, Calif.

Application April 19, 1946, Serial No. 663,494

14 Claims. (Cl. 308—244)

My invention relates to insert bearing structure and particularly to shims therefor.

One of the principal objects of this invention is to provide a bearing or journal structure, and particularly an internal combustion or other engine bearing, in which the shaft-engaging bearing surface may be renewed or refitted around the shaft adapted to rotate therein, by inserting a shim between a removable insert bearing member and the insert bearing holder or rigid member of the bearing box commonly referred to as the cap.

Another important object of this invention is to provide a novel and effective shim of this class for reducing the size of the bearing and for taking up the particular and usual irregular wear in bearings, such as in the connecting rod and main bearings of internal combustion engines.

An important object of this invention is to provide a shim of this class which is relatively thick at the median portion and becomes thinner or tapers at the opposite sides thereof to relatively thin edges, an object of this invention being to provide a relatively flat thin or foil-like shim which may be readily distorted into semi-circular form to fit between a correspondingly shaped insert bearing member and a rigid bearing box member or insert bearing holder.

A further important object of this invention is to provide shim stock that shims of the desired width may be easily cut therefrom to fit a particular bearing.

Further objects and advantages of the invention will be apparent from the following specification taken in conjunction with the accompanying drawings, wherein.

Figure 1:
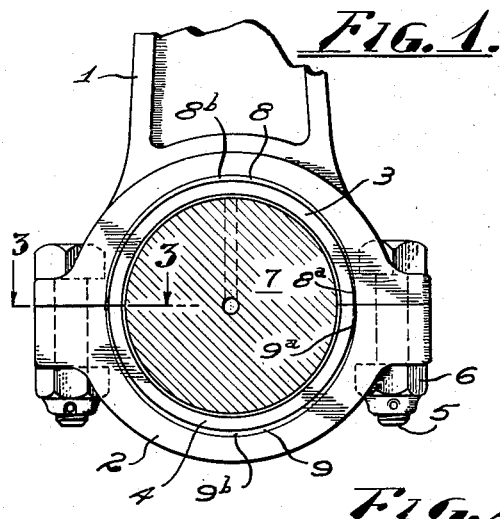
Fig. 1 is a fragmentary side elevation of a connecting rod assembled with a crank shaft, the latter being illustrated in cross section and with the connecting rod incorporating therein one embodiment of the invention.
Figure 2:
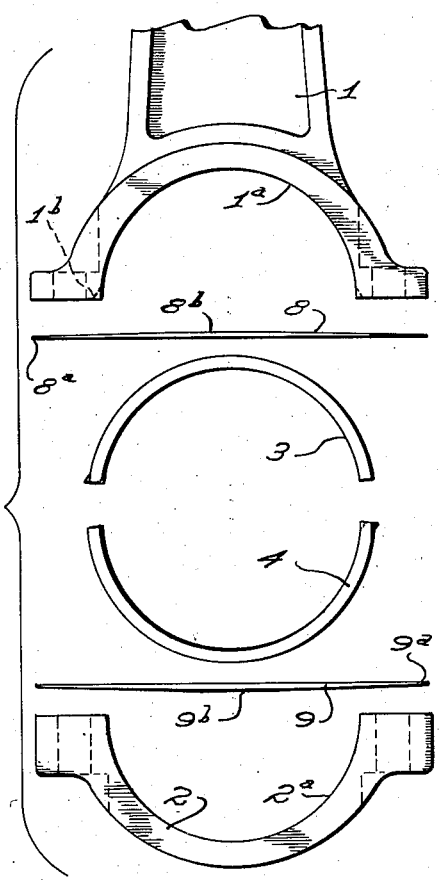
Fig. 2 is an exploded view of the elements thereof, showing the same in their normal conditions when not assembled.

The connecting rod assembly, shown in Figs. 1 and 2, as employed in conventional internal combustion engine construction, consists of an upper connecting rod member 1, and a connecting rod bearing cap 2. Many of such connecting rods employ semi-circular insert bearings, or insert bearing members, designated 3 and 4, which are circularly coextensive with the bearing portions of the connecting rod members 1 and 2. When assembled with the connecting rod members 1 and 2 and secured in position by bolts 5 and nuts 6, the bearing members 3 and 4 form a perfect circular bearing for the countershaft which they embrace.

Figure 3:
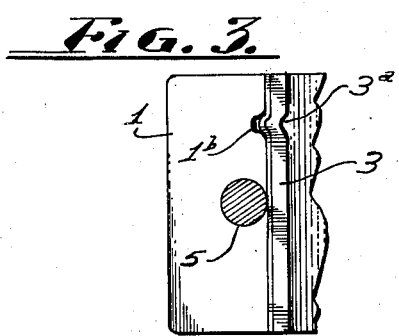
Fig. 3 is a fragmentary sectional view thereof, taken through 3—3 of Fig. 1, showing the manner of securing the insert bearing member and shim to one of the elements of a connecting rod.

These insert bearings, or bearing members, are usually formed of thin steel, approximately three thirty-seconds of an inch (3/32") in thickness and are lined on their bearing sides with a few thousandths of suitable bearing material. These insert bearings or bearing members are normally slightly larger in diameter, that is, across their ends, than when in use, but are compressed within, or pinched into the semicircular recesses 1ª and 2ª in the connecting rod members 1 and 2, so as to form a perfect circular bearing for the crank-shaft 7. These insert bearings, or bearing members, may be secured against endwise movement within the connecting rod members by upsetting an edge portion of the insert bearing members, as indicated by 3ª in Fig. 3, into recesses 1ᵇ, also shown in this figure.

The piston, which is attached to the opposite end of the connecting rod (not shown), transfers, during the explosion and compression strokes of the engine, extreme force, which is transferred against the inner side of the bearing, that is, the central portion of the bearing member 3. When the piston and connecting rod move in the opposite direction, there is exerted considerable force against the diametrically opposite side of the bearing, that is, at the central portion of the bearing member 4. This produces considerable wear against these portions, the wear being approximately twice the amount of the wear of the lateral side of the bearing, that is, at the ends of the bearing members 3 and 4.

I have developed a shim, designated 8 and 9 in Figs. 1 and 2, to compensate for such uneven wear. The shims employed are approximately one-half as thick at the ends, as indicated by 8ª and 9ª, than at the middle portions, designated 8ᵇ and 9ᵇ. The end portions of these shims therefore taper from the middle or ridged portion toward the opposite ends.

If the wear of the bearing at the upper and lower portions thereof amounts to four thousandths of an inch (.004"), the wear of the lateral portions is approximately two thousandths of an inch (.002"). If such amount of wear is to be taken up by the shim, the shim is relatively thin, and may be readily bent or formed into semicircular shape and thus secured between, respectively, the bearing members 3 and 4 and the connecting rod elements 1 and 2 when the bearing members 3 and 4 are forced or pinched into position. In other words, the shim is formed of a sheet of metal of foil-like thickness and flexibility in order that it may be readily distortable about said insert.

The middle portion of the shim may have a relatively wide uniform portion, instead of formed into a ridge, from which the shim tapers in the opposite direction.

This shim may be fabricated in this manner from resilient metal, including steel, or the like, by rolling the material.

Figure 5:
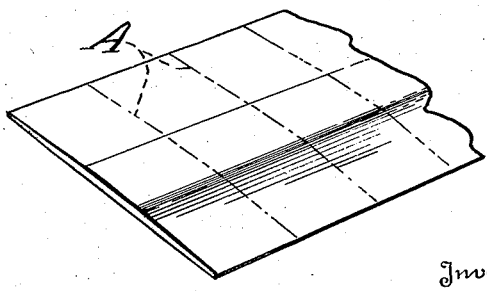

A number of such shims may be fabricated in one piece by rolling a long strip in this manner to form shim stock, as shown in Fig. 5. The required lengths of such shim stock are then cut from the strip, as desired, the cutting lines being indicated by A in Fig. 5.

Instead of rolling the material into such shape, a uniform thickness sheet may be plated by providing a thinner layer or plating at the ends than at the middle portion, thus providing the desired taper.

This progressive decrease in thickness from the middle portion toward the edges may be in steps, as when several thin sheets of material are brazed or otherwise secured together.

Figure 4:
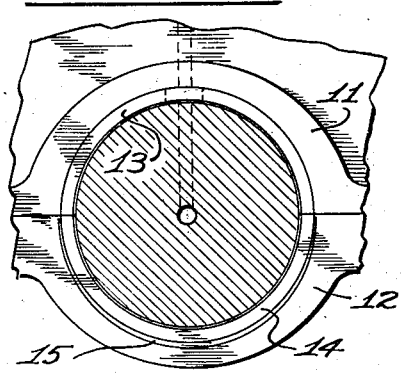
Fig. 4 is a fragmentary view of a bearing, such as employed as a main crankshaft bearing in internal combustion engines, also incorporating my invention; and, Fig. 5 is a perspective view of a fragmentary portion of shim stock from which shims may be made for the bearing structure shown.

In Fig. 4 of the drawings, which shows a main bearing of an internal combustion engine, and in which the engine block is indicated by 11 and the bearing cap by 12, slightly different wear of the bearing takes place. In this instance, when insert bearings are used, the upper insert bearing member 13 may not receive any or only little wear while the lower insert bearing member 14 may receive considerable wear. But in this instance also the middle portion of the bearing member 14 receives approximately twice the wear of the end portions. Therefore, a shim 15 is used in this instance of the same description as that described above.

Though I have shown and described a particular construction, combination, and arrangement of parts and portions, and a certain modification thereof, I do not wish to be limited to the same; but desire to include in the scope of my invention the construction, combination, and arrangement substantially as set forth in the appended claims.

I claim:

1. A shim for disposition between a shaft engaging bearing insert and its holder for compensating for a greater degree of wear over an intermediate portion of said insert than at the ends thereof, said shim comprising a metal sheet of foil-like thickness and of such thickness and flexibility as to be readily distortable about said insert, the intermediate portion of said shim which is designed to be disposed adjacent the portion of the insert having the the greater degree of wear being at least substantially twice the thickness of one of the portions of the shim to be disposed adjacent the ends of the insert.

2. A shim designed for insertion between the insert and holder of a friction bearing for taking up wear on the bearing surface of the insert, said shim comprising a metallic sheet of foil-like thickness and of such flexibility as to be readily distortable about said insert, said shim having a thickened portion intermediate the ends thereof adapted to be disposed adjacent the portion of the greatest wear of the insert.

3. A multiple shim stock sheet from which one or more shims can be detached for insertion between the insert and holder of a friction bearing for taking up wear, said sheet being of foil-like thickness and of such flexibility as to be readily distortable about said insert with each shim having a thickened portion intermediate the ends thereof adapted to be disposed adjacent the portion of the greatest wear of the insert.

4. In a bearing a bearing cap, a removable bearing insert carried by said cap, and a shim located between said cap and said insert, said shim comprising a metal sheet of foil-like thickness and of such thickness and flexibility as to be readily distortable about said insert, the intermediate portion of said shim which is designed to be disposed adjacent the portion of the insert having the greater degree of wear being at least substantially twice the thickness of one of the portions of the shim to be disposed adjacent the ends of the insert.

5. In a bearing a bearing cap, a removable bearing insert carried by said cap, and a shim located between said cap and said insert, said shim comprising a metallic sheet of foil-like thickness and of such flexibility as to be readily distortable about said insert, said shim having a thickened portion intermediate the ends thereof adapted to be disposed adjacent the portion of the greatest wear of the insert.

6. A shim for disposition between a shaft engaging bearing insert and its holder for compensating for a greater degree of wear over the intermediate portion of said insert than at the ends thereof, said shim comprising a flexible rolled metal sheet of foil-like thickness capable of being readily distortable about said insert, the intermediate portion of said shim which is designed to be disposed adjacent the portion of the insert having the greater degree of wear being rolled to a thickness substantially twice the thickness of the portions of the shim to be disposed adjacent the ends of the insert.

7. A shim comprising a rolled one piece flexible body of foil-like thickness readily distortable about a bearing insert with the intermediate portion of the shim designed to be disposed adjacent a portion of the insert having the greater degree of wear and of a thickness at least substantially twice that of the thickness of the portions of the shim to be disposed adjacent the ends of the insert.

8. A one piece flexible shim fabricated from metal and in which metal is transposed in a manner to provide a shim of foil-like thickness capable of being readily distorted about a bearing insert, said shim being tapered from its central portion to both edges thereof.

9. A rolled multiple shim stock sheet from which one or more shims can be detached for insertion under a shaft bearing, said sheet being formed of shim stock and tapered from the center to both edges thereof.

10. A rolled multiple shim stock sheet from which one or more shims can be detached for insertion between the insert and the holder of a friction bearing for taking up wear, said sheet being a one piece flexible body of foil-like thickness such that when a shim is detached it may be readily distortable about an insert and having a thickened portion intermediate its ends.

11. A multiple shim stock sheet from which one or more shims can be detached for insertion between the insert and holder of a friction bearing for taking up wear, said sheet being of foil-like thickness and of such flexibility as to be readily distortable about said insert with each shim having a thickened portion intermediate the ends thereof adapted to be disposed adjacent the portion of the greatest wear of the insert, said sheet being composed of a single piece of homogeneous material of minimum density in said thickened portion and of progressively greater density extending therefrom.

12. A shim for disposition between a shaft engaging bearing insert and its holder for compensating for a greater degree of wear over an intermediate portion of said insert than at the ends thereof, said shim comprising a metal sheet of foil-like thickness and of such thickness and flexibility as to be readily distortable about said insert, the intermediate portion of said shim which is designed to be disposed adjacent the portion of the insert having the greater degree of wear being at least substantially twice the thickness of one of the portions of the shim to be disposed adjacent the ends of the insert, said sheet being composed of a single piece of homogeneous material with the portions of the shim to be disposed adjacent the ends of the insert tapered and of progressively greater density toward the extremities of said sheet than at its thicker intermediate portion.

13. A shim for disposition between a shaft engaging bearing insert and its holder for compensating for a greater degree of wear over an intermediate portion of said insert than at the ends thereof, said shim comprising a metal sheet of foil-like thickness and of such thickness and flexibility as to be readily distortable about said insert, the intermediate portion of said shim which is designed to be disposed adjacent the portion of the insert having the greater degree of wear being at least substantially twice the thickness of one of the portions of the shim to be disposed adjacent the ends of the insert, said metal sheet having greater density adjacent its ends than at its intermediate portion.

14. A shim for disposition between a shaft engaging bearing insert and its holder for compensating for a greater degree of wear over an intermediate portion of said insert than at the ends thereof, said shim comprising a metal sheet of foil-like thickness and of such thickness and flexibility as to be readily distortable about said insert, the intermediate portion of said shim which is designed to be disposed adjacent the portion of the insert having the greater degree of wear being of substantially greater thickness than the portions of the shim to be disposed adjacent the ends of the insert, said sheet being composed of a single piece of homogeneous material with the portions of the shim to be disposed adjacent the ends of the insert tapered and of progressively greater density toward the extremities of said sheet than at its thicker intermediate portion.

References Cited in the file of this patent

UNITED STATES PATENTS

| | | |
|---|---|---|
| 371,911 | Andrews | Oct. 25, 1887 |
| 922,990 | White | May 25, 1909 |
| 1,267,485 | Widdup | May 28, 1918 |
| 1,421,441 | Flinn | July 4, 1922 |
| 1,445,693 | King | Feb. 20, 1923 |
| 1,470,966 | Erdahl et al. | Oct. 16, 1923 |
| 1,863,809 | Hopkins | June 21, 1932 |
| 1,868,817 | Dunham | July 26, 1932 |
| 1,981,500 | Frelin | Nov. 20, 1934 |